United States Patent [19]
Pierce

[11] 3,853,328
[45] Dec. 10, 1974

[54] ROTARY SEAL
[75] Inventor: Ronald F. Pierce, Poland, Ohio
[73] Assignee: NRN Corporation, Akron, Ohio
[22] Filed: Aug. 27, 1973
[21] Appl. No.: 391,579

[52] U.S. Cl............................................ 277/72 R
[51] Int. Cl......................... F16j 15/32, F16j 15/40
[58] Field of Search ........ 156/415, 416, 417; 277/3, 277/15, 16, 70–79, DIG. 8

[56]  References Cited
UNITED STATES PATENTS

| | | | |
|---|---|---|---|
| 1,879,855 | 9/1932 | Morton | 277/72 |
| 3,077,252 | 2/1963 | Treer | 277/DIG. 8 |
| 3,100,647 | 8/1963 | Lee et al. | 277/75 |
| 3,122,166 | 2/1964 | Polter | 277/74 |
| 3,122,167 | 2/1964 | Wadey | 277/74 |
| 3,128,941 | 4/1964 | Waibel | 277/75 |
| 3,408,085 | 10/1968 | Van Spijk et al. | 277/74 |
| 3,542,374 | 11/1970 | Neilson | 277/16 |

FOREIGN PATENTS OR APPLICATIONS 1,217,999  12/1959  France................................. 277/74

Primary Examiner—Louis R. Prince
Assistant Examiner—Robert I. Smith
Attorney, Agent, or Firm—Maky, Renner & Lacher

[57]  ABSTRACT

A rotary seal for transmitting fluid to a rotatable shaft in which the stationary housing has annular sections with fluid passages leading from a manifold to the shaft. Each of the annular sections has a pair of annular seals on opposite sides of the fluid passage for preventing flow of the fluid axially of the shaft. The seals are retained in recesses at the edges of the sections by backing members having lubricating and vent passages for lubrication of the seals.

14 Claims, 8 Drawing Figures

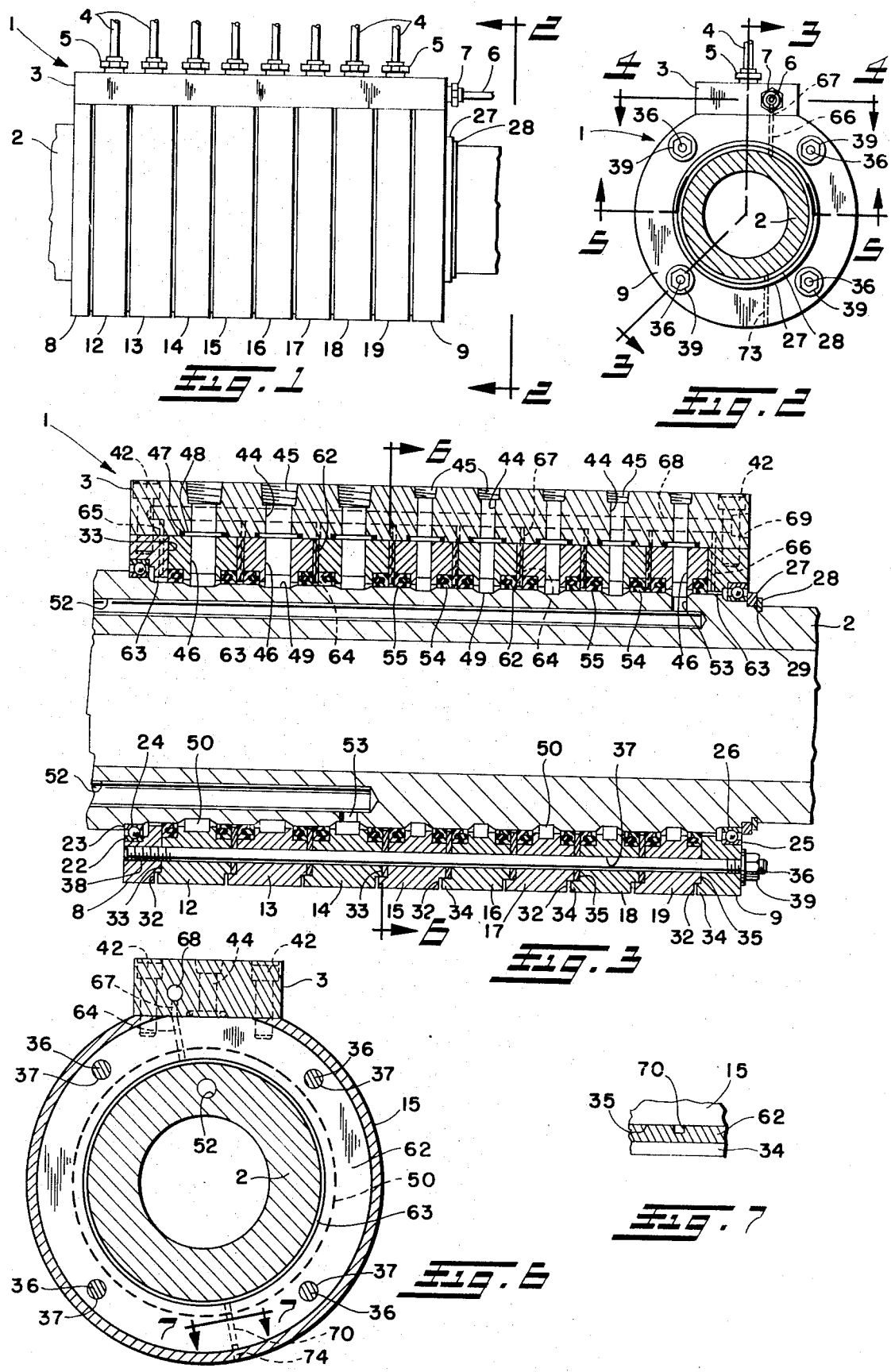

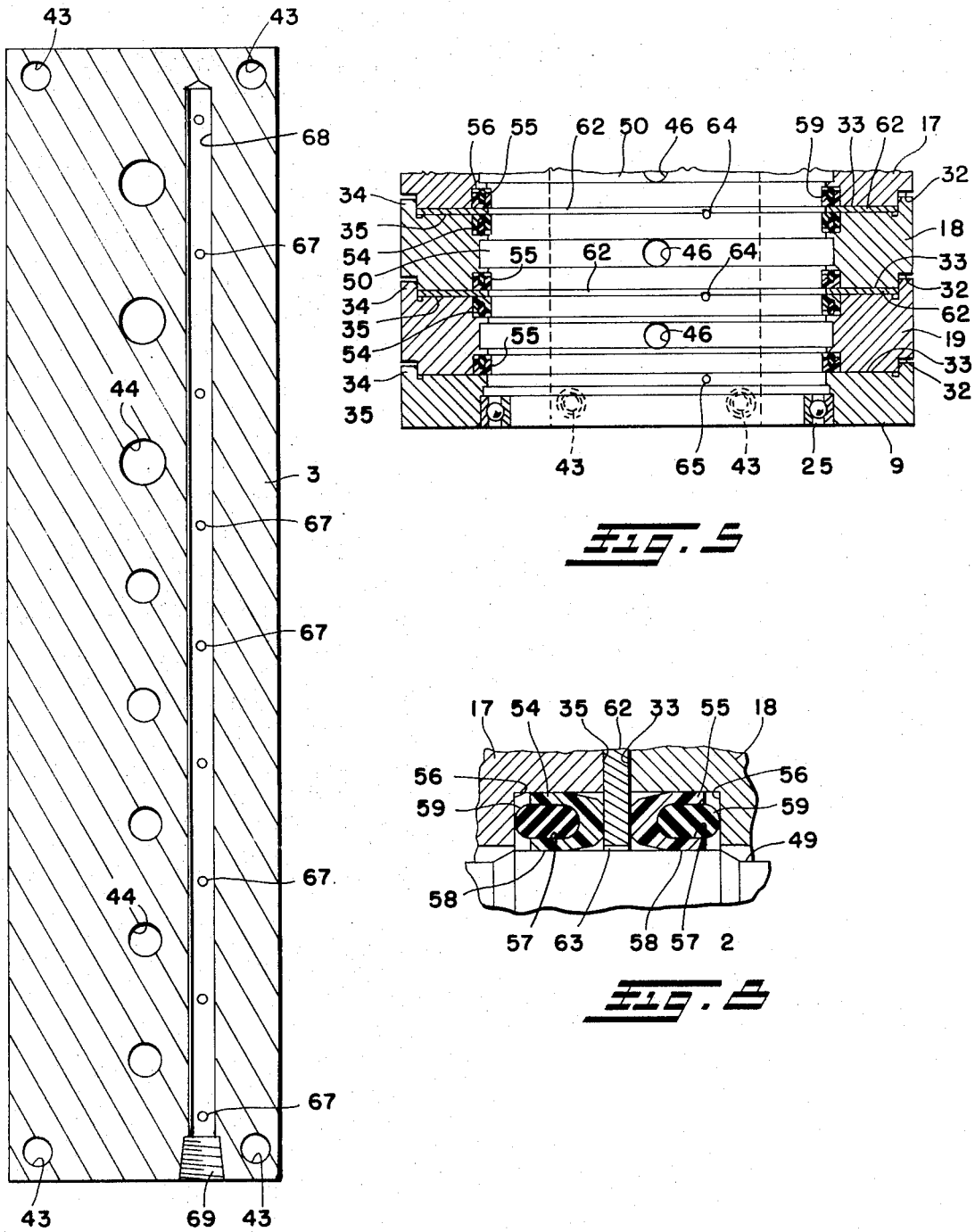

ROTARY SEAL

This invention relates generally, as indicated, to a rotary seal for transmitting a fluid medium which may be gaseous or liquid from a stationary manifold to a rotatable shaft. The invention is especially adapted for rotary seals in which a number of fluid passages are provided for conveying fluid to a number of passages in the shaft.

In applications such as tire building machines, it is necessary to communicate air under pressure through a shaft to different air operated components of the tire building machine and it is important that this be done with a minimum of leakage. The shaft is rotatable; however, the rotation is not continuous but consists of different movements for different tire building operations. The shaft must be stopped during placing of the beads and removing of the tire. The shaft is slowly rotated during application of ply material and the shaft is rapidly rotated during the stitching of the plies. This service has made it difficult to provide a rotary seal which will have a suitable service life and at the same time have a reasonable cost.

It is, accordingly, a principal object of this invention to provide a rotary seal in which the fluid is transmitted to the shaft without leakage.

Another object is to provide seals at opposite sides of each fluid passage with backing members to hold the seals in position.

Still another object is to provide lubrication of the seals through passages in the backing members.

A further object is to provide a lubricating channel around the shaft for communicating lubricant to the seals.

Another object is to provide vents for proper flow of lubricant to the seals.

Still another object is to provide annular recesses in the rotary seal for mounting the seals.

A further object is to provide seals with the shaft-engaging portions urged against the shaft by resilient annular ring members disposed within the seals.

These and other objects of the present invention may be achieved by a rotary seal having a number of annular sections with fluid passages leading from a manifold to the shaft. Each of the annular sections may have a pair of annular seals on opposite sides of the fluid passage with a backing member containing lubricating and vent passages for lubrication of the seals.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In the annexed drawings:

FIG. 1 is an elevation of a rotary seal constructed in accordance with this invention and shown mounted on a shaft, parts being broken away.

FIG. 2 is an end view taken along the plane of line 2—2 of FIG. 1.

FIG. 3 is an enlarged sectional view taken along the planes of line 3—3 of FIG. 2.

FIG. 4 is an enlarged sectional view of the manifold taken along the plane of line 4—4 of FIG. 2.

FIG. 5 is an enlarged fragmentary sectional view taken along the plane of line 5—5 of FIG. 2 showing one end of the rotary seal in greater detail.

FIG. 6 is a transverse sectional view showing one of the discs as installed taken along the plane of line 6—6 of FIG. 3.

FIG. 7 is an enlarged fragmentary sectional view of the disc taken along the plane of line 7—7 of FIG. 6.

FIG. 8 is an enlarged fragmentary sectional view like FIG. 3 showing the seals in greater detail.

Referring now in detail to the drawings and especially to FIGS. 1 and 2, there is shown by way of example a rotary seal 1 made in accordance with this invention mounted on a rotatable shaft 2. The rotary seal 1 has a stationary manifold 3 for receiving a fluid medium such as air through conduits 4 connected to the manifold by couplings 5. A lubricant such as oil may also be communicated to the manifold 3 through a pipe 6 connected to the manifold by coupling 7.

The rotary seal 1 has a front end ring 8 and a rear end ring 9 with annular section members 12, 13, 14, 15, 16, 17, 18 and 19 interposed between the end rings. Referring to FIG. 3, the construction is shown in more detail. The front end ring 8 is rotatably mounted on the shaft 2 on a ball bearing 22 with the inner land 23 abutting a shoulder 24 of the shaft. The rear end ring 9 is rotatably supported on the shaft 2 by a ball bearing 25 having an inner land 26 abutting a retaining ring 27 which is held in place by a spring washer 28 seated in a groove 29 of the shaft 2.

The front end ring 8 as well as the annular section members 12 thorugh 19 have annular recesses 32 at the outer periphery of radially extending sides 33. The rear end ring 9 and the annular section members 12 through 19 have an annular flange 34 at the outer periphery of radially extending sides 35 for nesting engagement with the recesses 32 to hold the section members and end rings 8 and 9 in concentric relationship. Tie rods 36 extend through aligned holes 37 in the rear end ring 9 and section members 12 through 19 and are threaded in an aligned hole 38 in the front end ring 8. Nuts 39 are threaded on the ends of the tie rods 36 extending through the rear end ring 9 for clamping end rings 8 and 9 and the section members 12 through 19 together.

The manifold 3 is mounted on the end rings 8 and 9 by studs 42, shown in dotted lines in FIGS. 3 and 6, which extend through holes 43, shown in FIG. 4. Fluid passages 44 in the manifold 3 may be of different sizes and have threaded ends 45 for receiving the couplings 5 of conduits 4 in threaded engagement. The fluid passages 44 in the manifold 3 are in alignment with fluid passages 46 in the annular section members 12 through 19. O-rings 47 are disposed in grooves 48 in the manifold 3 at the interface between the manifold and the annular section members 12 through 19 to prevent leakage of the fluid conveyed through the passages 44 and 46.

The shaft 2 may have annular grooves 49 at positions opposite the fluid passages 46 in the annular section members. The section members 12 through 19 also have annular grooves 50 at the ends of the fluid passages 46 for conveying fluid around the shaft 2. The grooves 49 in the shaft 2 are connected to drilled holes 52 extending axially of the shaft by connecting holes 53 for conveying fluid to other locations along the shaft.

As shown more clearly in FIGS. 5 and 8, each of the annular section members 12 through 19 has a pair of annular seals 54 and 55 located on opposite sides of the fluid passages 46 mounted in recesses 56 at the radially inner edges of the radially extending sides 33 and 35 of the annular section members. The seals 54 and 55 may be U-shaped, as shown in FIG. 8, with the open ends 57 facing the fluid passage 46 to prevent flow of the fluid in the direction from the fluid passage outward to the sides 33 and 35 of the section members. The seals 54 and 55 may be of a resilient material having a low coefficient of friction such as a suitable tetrafluoro-ethylene resin so that a sealing surface 58 in engagement with the shaft 2 slides easily on the shaft. Spring means may be provided in the open ends 57 of the seals 54 and 55 to urge the sealing surface 58 of the shaft-engaging portions of the seals against the shaft 2. In the preferred embodiment shown in the drawings, a resilient member such as annular ring 59 is disposed in the open ends 57 and may be of rubber or other resilient rubberlike material. A spirally wound spring may also be used if desired.

Backing members for the seals 54 and 55 such as annular discs 62 are mounted within the annular flanges 34 and along sides 33 and 35 of the section members 12 through 19. In the embodiment shown, the discs 62 are separate from the annular section members 12 through 19; however, it may be desirable to fasten the discs to the section members or machine them as intergral parts of the section members. At the ends of the rotary seal 1, the radially extending sides of the front end ring 8 and rear end ring 9 act as the backing members for the seals 54 and 55. The discs 62 and the front end ring 8 and rear end ring 9 restrict axial movement of compress the seals 54 and 55 in the recesses 56 which is desirable for effective sealing action.

Even though the material of the seals 54 and 55 has a low coefficient of friction, the point of engagement of the sealing surface 58 with the shaft may produce considerable wear and preferably the shaft 2 is hardened or chrome plated to provide a wear-resistant surface.

Lubrication of the seals 54 and 55 may also be desirable and with this construction provision is made for lubricating the seals. The discs 62 and the end rings 8 and 9 have an inner diameter greater than the diameter of shaft 2 and thereby provide channels 63 between the inner periphery of the discs and end rings and the shaft for conveying lubricant around the shaft and to the seals 54 and 55. The lubricant is communicated to the channels 63 by fluid passages or grooves 64 in the discs 62 and by holes 65 and 66 in the front and rear end rings 8 and 9, respectively. These grooves 64 and holes 65 and 66 are in alignment with lubricating passages 67 in the manifold 3, as shown in FIG. 4, connected to a main lubricating passage 68 which has a threaded end 69 for receiving the coupling 7 of the lubricant pipe 6, shown in FIGS. 1 and 2.

Preferably, lubricant is provided by an oil mist type of system in which oil carried by air is pumped through the lubricant pipe 6 to the channels 63. In order to provide a workable oil mist system, vent passages such as grooves 70 in the discs 62 and holes 72 and 73 in the front end ring 8 and rear end ring 9, respectively, are provided to vent the channels 63 to the atmosphere at a position spaced from the lubrication passages 64, 65 and 66 of the discs 62 and end rings. This is shown more clearly in FIG. 6 for the discs 62 and in FIG. 2 for the end ring 9 which is vented the same way as front end ring 8. As shown in FIG. 6, holes 74 in the annular flanges 34 of the annular section members 12 through 19 may be provided in alignment with the grooves 70 so that a continuous vent passage to the atmosphere from the channel 63 is provided.

In operation of the rotary seal, fluid under pressure such as air is communicated to the conduits 4. This air is then communicated through the fluid passages 44 in the manifold 3 to fluid passages 46 in the annular section members 12 through 19 and then to the grooves 49 in the shaft and from there through connecting holes 53 to axially extending holes 52 in the shaft 2.

The O-rings 47 prevent leakage at the interface between the manifold 3 and the annular section members 12 through 19. The seals 54 and 55 prevent leakage at the shaft 2. The backing members such as discs 62 and end rings 8 and 9 not only restrict the axial movement of the seals 54 and 55 in the recesses 56 but also provide lubrication to the channels 63 between the seals. The lubricant may be provided to the seals continuously or, as in the present embodiment, at predetermined intervals in the operation of a tire building machine. At these predetermined times, air is pumped through a venturi connected to an oil supply and the oil mist is then communicated through lubricant pipe 6 into the manifold 3 and through the channels 63 where the oil is directed around the shaft 2 and lubricates the seals 54 and 55. The air from the oil mist may then be vented from the channels 63 through grooves 70 in the discs 62 and through holes 72 and 73 in the front end ring 8 and rear end ring 9.

It will be understood that different types of seals and manifolds may be used within the scope of this invention.

The embodiments of the invention in which an exclusive property or privilege is claimed are defined as follows:

1. A rotary seal for transmitting fluid from a stationary manifold to a rotatable shaft comprising an annular section member with radially extending sides having a fluid passage extending from said manifold to said shaft, a pair of annular seals at opposite sides of said fluid passage for sealing the space between said annular section and said shaft, backing members at the sides of said annular section member overlapping said seals and said backing members having lubricating passages extending from said manifold to said seals for communicating lubricant to said seals.

2. A rotary seal according to claim 1 wherein at least one of said backing members is an annular disc.

3. A rotary seal according to claim 2 wherein the inner diameter of said disc is greater than the diameter of said shaft whereby a channel is provided between the shaft and disc for communicating lubricant around said shaft to one of said seals.

4. A rotary seal according to claim 3 wherein said disc has a vent passage extending from said channel to the outer periphery of said disc whereby flow of lubricant through said channel is facilitated.

5. A rotary seal according to claim 4 wherein said annular section member has an annular recess at the outer periphery of one of said sides and is disposed alongside a second section member with said disc interposed therebetween, said second section member having an annular flange at the outer periphery for nesting engagement in said recess whereby the section members of said rotary seal are held in concentric relationship.

6. A rotary seal according to claim 5 wherein a vent hole is provided in said flange in alignment with said vent passage of said disc providing communication from said channel to the outer periphery of said flange.

7. A rotary seal according to claim 5 wherein said annular section member and said second annular section member have axially extending holes in alignment and tie rods disposed in said holes for clamping the rotary seal section members together.

8. A rotary seal according to claim 1 wherein one of said backing members is an end ring and one of said lubricating passages is a hole in said ring.

9. A rotary seal according to claim 8 wherein the inner diameter of said ring is greater than the diameter of said shaft whereby a channel is provided between the shaft and ring for communicating lubricant around said shaft to one of said seals.

10. A rotary seal according to claim 8 wherein said end ring has a vent passage extending from said channel to the outer periphery of said ring whereby flow of lubricant through said channel is facilitated.

11. A rotary seal according to claim 1 wherein said seals prevent flow of fluid in the direction from said fluid passage outward to the sides of said section member.

12. A rotary seal according to claim 11 wherein said section member has annular recesses at the radially inner edges of said sides and said seals are mounted in said recesses whereby said backing members are in position to abut said seals.

13. A rotary seal according to claim 1 wherein each of said seals includes a resilient member for urging the sealing surface of said seal against said shaft.

14. A rotary seal according to claim 13 wherein each of said seals further comprises an outer shaft-engaging portion with a low coefficient of friction and an annular ring of resilient rubberlike material between said shaft-engaging portion and said section member to urge said shaft-engaging portion into sealing engagement with said shaft.

* * * * *

UNITED STATES PATENT OFFICE
CERTIFICATE OF CORRECTION

Patent No. 3,853,328                     Dated December 10, 1974

Inventor(s)    Ronald F. Pierce

It is certified that error appears in the above-identified patent and that said Letters Patent are hereby corrected as shown below:

The Assignee "NRN Corporation" should read

--NRM Corporation--.

Signed and sealed this 4th day of February 1975.

(SEAL)
Attest:

McCOY M. GIBSON JR.                      C. MARSHALL DANN
Attesting Officer                        Commissioner of Patents